(12) United States Patent
Zhou et al.

(10) Patent No.: US 9,961,151 B2
(45) Date of Patent: *May 1, 2018

(54) METHOD, APPARATUS AND SYSTEM FOR DEVICE DISCOVERY

(71) Applicant: Huawei Technologies Co., Ltd., Shenzhen (CN)

(72) Inventors: Weihua Zhou, Shenzhen (CN); Yali Guo, Shenzhen (CN); Wanqiang Zhang, Munich (DE); Xiaobo Wu, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days. days.

This patent is subject to a terminal disclaimer.

(21) Appl. No.: 15/620,518

(22) Filed: Jun. 12, 2017

(65) Prior Publication Data

US 2017/0279902 A1    Sep. 28, 2017

Related U.S. Application Data

(63) Continuation of application No. 14/502,530, filed on Sep. 30, 2014, now Pat. No. 9,692,836, which is a (Continued)

(30) Foreign Application Priority Data

Apr. 13, 2012 (CN) .......................... 2012 1 0108880

(51) Int. Cl.
*G06F 15/16* (2006.01)
*H04W 76/02* (2009.01)
(Continued)

(52) U.S. Cl.
CPC .............. *H04L 67/16* (2013.01); *H04L 43/10* (2013.01); *H04L 67/18* (2013.01); *H04W 8/005* (2013.01);
(Continued)

(58) Field of Classification Search
USPC .................................................. 709/224, 219
See application file for complete search history.

(56) References Cited

U.S. PATENT DOCUMENTS 8,892,722 B1    11/2014    Kopikare et al.
9,036,509 B1    5/2015    Addepalli et al.
(Continued)

FOREIGN PATENT DOCUMENTS

CN    1527621 A    9/2004
CN    101371603 A    2/2009
(Continued)

OTHER PUBLICATIONS

U.S. Appl. No. 14/502,530, filed Sep. 30, 2014.
U.S. Appl. No. 15/602,978, filed May 23, 2017.

*Primary Examiner* — Jude Jean Gilles
(74) *Attorney, Agent, or Firm* — Leydig, Voit & Mayer, Ltd.

(57) ABSTRACT

The present invention provides a method, an apparatus and a system for device discovery. The method includes: acquiring, by a first device, a user identification of a target user, and acquiring, according to the user identification of the target user, broadcast information of a second device which the target user logs in; when broadcast information of another device is monitored through a D2D function, matching, by the first device, the monitored broadcast information with the broadcast information of the second device, and if the match is successful, determining, by the first device, that the second device and the first device are within a preset distance. According to the present invention, the accuracy of discovering a short distance user is improved and, thus, the problem in the prior art that the accuracy of discovering a user in a short distance cannot be guaranteed by using a cell ID is solved.

12 Claims, 9 Drawing Sheets

Related U.S. Application Data continuation of application No. PCT/CN2013/074213, filed on Apr. 15, 2013.

(51) Int. Cl.
*H04L 29/08* (2006.01)
*H04W 8/00* (2009.01)
*H04L 12/26* (2006.01)
*H04W 48/10* (2009.01)
*H04W 48/16* (2009.01)

(52) U.S. Cl.
CPC ......... *H04W 48/10* (2013.01); *H04W 76/023* (2013.01); *H04W 48/16* (2013.01)

(56) References Cited

U.S. PATENT DOCUMENTS

| | | | | |
|---|---|---|---|---|
| 9,692,836 | B2* | 6/2017 | Zhou | H04W 48/10 |
| 2002/0194601 | A1* | 12/2002 | Perkes | G06Q 30/02 |
| | | | | 725/44 |
| 2003/0110503 | A1* | 6/2003 | Perkes | H04N 7/17318 |
| | | | | 725/86 |
| 2003/0182421 | A1 | 9/2003 | Faybishenko et al. | |
| 2005/0071884 | A1* | 3/2005 | Champel | H04N 21/40 |
| | | | | 725/119 |
| 2005/0188062 | A1 | 8/2005 | Li et al. | |
| 2006/0160544 | A1 | 7/2006 | Sun et al. | |
| 2007/0211678 | A1 | 9/2007 | Li et al. | |
| 2008/0307096 | A1* | 12/2008 | Wang | G06F 15/16 |
| | | | | 709/227 |
| 2009/0016524 | A1 | 1/2009 | Park et al. | |
| 2009/0070472 | A1* | 3/2009 | Baldus | A61B 5/0028 |
| | | | | 709/227 |
| 2009/0092075 | A1 | 4/2009 | Corson et al. | |
| 2010/0250135 | A1 | 9/2010 | Li et al. | |
| 2011/0083111 | A1 | 4/2011 | Forutanpour et al. | |
| 2011/0249631 | A1 | 10/2011 | Li et al. | |
| 2011/0258313 | A1 | 10/2011 | Mallik et al. | |

FOREIGN PATENT DOCUMENTS

| | | |
|---|---|---|
| CN | 101690039 A | 3/2010 |
| CN | 102412910 A | 4/2012 |
| WO | 2011130623 A2 | 10/2011 |
| WO | 2014085041 A1 | 6/2014 |

* cited by examiner

METHOD, APPARATUS AND SYSTEM FOR DEVICE DISCOVERY

CROSS-REFERENCE TO RELATED APPLICATIONS

This application is a continuation of U.S. patent application Ser. No. 14/502,530, filed on Sep. 30, 2014, which is a continuation of International Application No. PCT/CN2013/074213, filed on Apr. 15, 2013. The International Application claims priority to Chinese Patent Application No. 201210108880.5, filed on Apr. 13, 2012. All of the aforementioned patent applications are hereby incorporated by reference in their entireties.

TECHNICAL FIELD

The present invention relates to the field of communication technologies and, in particular, to a method, an apparatus and a system for device discovery.

BACKGROUND

With the widespread use of social applications, the function of short distance discovery becomes more and more important, and users prefer to be promptly informed of friends who appear or leave around, so as to further establish short distance communication with their friends.

In the prior art, a method for short distance discovery is based on an absolute location of a user. This method requires the user to report in real-time his location, such as cell ID information or GPS location information of the user, to a certain location server in a network. The server in the network calculates the distance between two users according to the cell ID information of the devices at which the two users locate or the GPS location information; if a certain condition is satisfied, it is determined that the two users are in a "short distance" range. For example, if it is learned according to the cell ID information of two UEs that the two UEs have the same cell ID, then it is determined that the two users are in the "short distance" range, further, the short distance communication may also be established between the two devices in a short distance.

Although the method for obtaining a device in a short distance range according to a cell ID can achieve short distance discovery between devices, the accuracy of discovering a user in a short distance cannot be guaranteed, thereby reducing the user experience when using the short distance discovery.

SUMMARY

Embodiments of the present invention provide a method, an apparatus and a system for device discovery, which can improve the accuracy of discovering a user in a short distance. The technical solutions are as follows:

In one aspect, a method for device discovery is provided, the method includes:

acquiring, by a first device, a user identification of a target user, and acquiring, according to the user identification of the target user, broadcast information of a second device which the target user logs in; and when broadcast information of another device besides the first device is monitored through a device-to-device (D2D) function, matching, by the first device, the monitored broadcast information with the broadcast information of the second device, and if the match is successful, determining, by the first device, that the second device and the first device are within a preset distance.

In another aspect, a method for device discovery is also provided, the method includes:

receiving, by an application server, a user identification of a target user sent by a first device;

querying, by the application server and according to the user identification of the target user, a device identity of a second device which the target user logs in, and if the device identity of the second device is queried, acquiring, by the application server, broadcast information of the second device according to the device identity of the second device;

returning, by the application server, the broadcast information of the second device to the first device, so that the first device matches monitored broadcast information with the broadcast information of the second device to determine whether the first device and the second device are within a preset distance.

In another aspect, a method for device discovery is provided, the method includes:

receiving, by an application server, a user identification of a target user sent by a first device;

querying, by the application server and according to the user identification of the target user, a device identity of a second device which the target user logs in;

if the device identity of the second device is queried, returning, by the application server, the device identity of the second device to a first device, so that the first device acquires a broadcast information of the second device according to the device identity of the second device, and matches monitored broadcast information with the broadcast information of the second device to determine whether the first device and the second device are within a preset distance.

In another aspect, a method for device discovery is also provided, the method includes:

receiving, by a short distance server, a request for querying broadcast information of a second device, where the query request is initiated by a first device and the query request includes a device identity of the second device; and finding, by the short distance server, the broadcast information of the second device according to the device identity of the second device, and returning the broadcast information of the second device to the first device, so that the first device matches monitored broadcast information with the broadcast information of the second device to determine whether the first device and the second device are within a preset distance.

In another aspect, a method for device discovery is also provided, the method includes:

receiving, by a short distance server, a request for querying broadcast information of a second device initiated by an application server, where the query request includes a device identity of the second device, and the query request is initiated by the application server through triggering by a first device according to a user identification of a target user, and the second device is a device which the target user logs in; and finding, by the short distance server, the broadcast information of the second device according to the device identity of the second device, and returning the broadcast information of the second device to the application server, so that the application server returns the broadcast information of the second device to the first device, and then the first device matches monitored broadcast information with the broadcast information of the second device to determine whether the first device and the second device are within a preset distance.

In another aspect, a method for device discovery is also provided, the method includes:

enabling, by a second device, a device-to-device (D2D) monitor and broadcast function; and broadcasting, by the second device, broadcast information of the second device itself through the D2D broadcast function, so that the first device is capable of monitoring the broadcast information of the second device, and the first device matches acquired broadcast information of a device which a target user logs in with the broadcast information of the second device, to determine whether the device which the target user logs in and the first device are within a preset distance.

In another aspect, an apparatus for device discovery is also provided, the apparatus includes:

an acquiring module, configured to acquire a user identification of a target user, and acquire, according to the user identification of the target user, broadcast information of a second device which the target user logs in; and a device discovery module, configured to, when broadcast information of another device besides the apparatus itself is monitored through a device-to-device (D2D) function, match the monitored broadcast information with the broadcast information of the second device acquired by the acquiring module, and if the match is successful, determine that the second device and the first device are within a preset distance.

In another aspect, an application server is also provided, the server includes:

a receiving module, configured to receive a user identification of a target user sent by a first device;

an acquiring module, configured to query, according to the user identification of the target user received by the receiving module, a device identity of a second device which the target user logs in, and if the device identity of the second device is queried, acquire a broadcast information of the second device according to the device identity of the second device;

a sending module, configured to return the broadcast information of the second device, which is acquired by the acquiring module, to the first device, so that the first device matches monitored broadcast information with the broadcast information of the second device to determine whether the first device and the second device are within a preset distance.

In another aspect, another application server is also provided, the server includes:

a receiving module, configured to receive a user identification of a target user sent by a first device;

a querying module, configured to query, according to the user identification of the target user received by the receiving module, a device identity of a second device which the target user logs in;

a sending module, configured to, if the device identity of the second device is queried by the querying module, return the device identity of the second device to the first device, so that the first device obtains broadcast information of the second device according to the device identity of the second device, and matches monitored broadcast information with the broadcast information of the second device to determine whether the first device and the second device are within a preset distance.

In another aspect, a short distance server is also provided, the server includes:

a receiving module, configured to receive a request for querying broadcast information of a second device, where the query request is initiated by a first device and the query request includes a device identity of the second device; and a querying module, configured to find the broadcast information of the second device according to the device identity of the second device received by the receiving module, and return the broadcast information of the second device to the first device, so that the first device matches monitored broadcast information with the broadcast information of the second device to determine whether the first device and the second device are within a preset distance.

In another aspect, another short distance server is also provided, the server includes:

a receiving module, configured to receive a request for querying broadcast information of a second device initiated by an application server, where the query request includes a device identity of the second device server, and the query request is initiated by the application server through triggering by a first device according to a user identification of a target user, and the second device is a device which the target user logs in;

a querying module, configured to find the broadcast information of the second device according to the device identity of the second device received by the receiving module, and return the broadcast information of the second device to the application server.

In another aspect, another apparatus for device discovery is also provided, the apparatus includes:

an enabling module, configured to enable a device-to-device (D2D) monitor and broadcast function of the apparatus;

a broadcasting module, configured to broadcast broadcast information of the apparatus after the enabling module enables the monitor and broadcast function, so that a first device is capable of monitoring broadcast information of a second device, and the first device matches acquired broadcast information of a device which a target user logs in with the broadcast information of the second device, to determine whether the device which the target user logs in and the first device are within a preset distance.

In another aspect, a system for device discovery is also provided, the system includes: the apparatus for device discovery as described above, the application server as described above, the another short distance server as described above and the another apparatus for device discovery as described above.

In another aspect, a system for device discovery is also provided, the system includes: the apparatus for device discovery as described above, the another application server as described above, the short distance server as described above and the another apparatus for device discovery as described above.

Technical solutions provided by embodiments of the present invention have beneficial effects as follows: the first device acquires the user identification of the target user, and acquires, according to the user identification of the target user, the broadcast information of the second device which the target user logs in; when the broadcast information of other devices is monitored through the D2D function, the first device matches the monitored broadcast information with the broadcast information of the second device, and if the match is successful, the first device determines that the second device and the first device are within a preset distance. Since the first device is capable of monitoring the broadcast information of other devices within a preset distance, the first device matches the acquired broadcast information of the second device with monitored broadcast information to determine whether the target user is monitored by the first device, therefore, the accuracy of discovering a user in a short distance can be improved and, thus, the problem in the prior art that the accuracy of discovering a user in a short distance cannot be guaranteed by using a cell ID is solved.

BRIEF DESCRIPTION OF DRAWINGS

To describe technical solutions in embodiments of the present invention more clearly, the following briefly describes the accompanying drawings required in the description of embodiments; apparently, the accompanying drawings illustrate only some exemplary embodiments of the present invention, and those skilled in the art can derive other drawings from these drawings without creative efforts.

DESCRIPTION OF EMBODIMENTS

In order to make the objects, technical solutions and advantages of the present invention clearer, implementations of the present invention are described in detail with reference to the accompanying drawings.

Since the short distance communication has a certain distance restriction, when whether two UEs are in a short distance range is judged by using cell ID information, on one hand, if the radius of a cell which the two UEs locate in is relatively large, then even if it is judged that the two users are in the "short distance" range according to the cell ID of the two UEs, the distance between these two UEs may be very large in fact, and may also do not meet the requirements of the short distance communication; on the other hand, two users which belong to two adjacent cells but are close to each other will also be judged as not being in the short distance range, thus short distance communication cannot be realized between the two devices in short distance communication. And in some areas, such as a large indoor shopping mall, the user cannot receive GPS signals.

Figure 1:
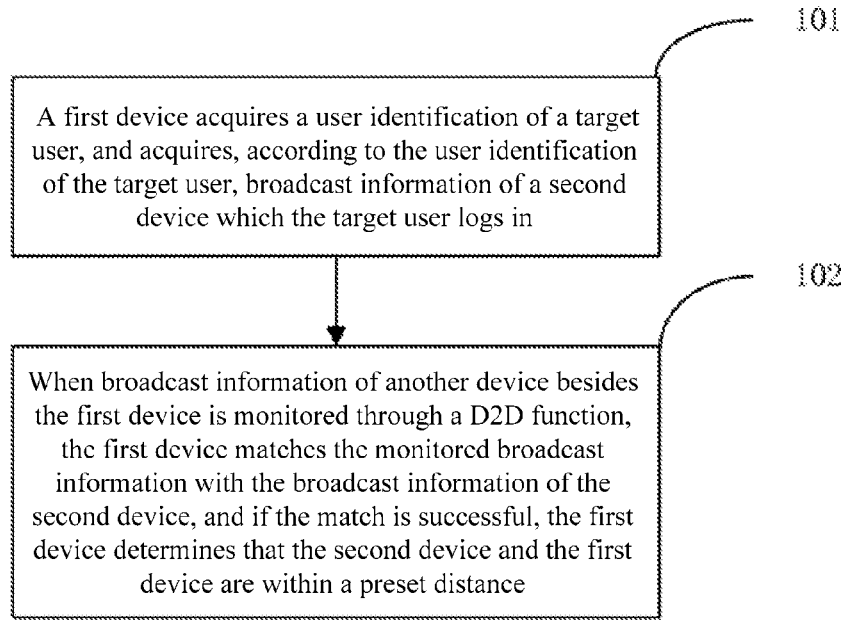
FIG. 1 is a flowchart of a method for device discovery according to an embodiment of the present invention.

The above method for short distance discovery cannot guarantee the accuracy of short distance user discovery, thereby reducing the user experience when using the short distance discovery. To solve the above problem, the present invention provides the following technical solutions:

Refer to FIG. 1, this embodiment provides a method for device discovery, including:

101, a first device acquires a user identification of a target user, and acquires, according to the user identification of the target user, broadcast information of a second device which the target user logs in;

102, when broadcast information of another device besides the first device is monitored through a D2D (Device-to-Device, device-to-device) function, the first device matches the monitored broadcast information with the broadcast information of the second device, and if the match is successful, the first device determines that the second device and the first device are within a preset distance.

Beneficial effects of this embodiment include: the first device acquires the user identification of the target user, and acquires, according to the user identification of the target user, the broadcast information of the second device which the target user logs in; when the broadcast information of other devices is monitored through the D2D function, the first device matches the monitored broadcast information with the broadcast information of the second device, and if the match is successful, the first device determines that the second device and the first device are within a preset distance. Since the first device is capable of monitoring the broadcast information of other devices within a preset distance, the first device matches the acquired broadcast information of the second device with monitored broadcast information to determine whether the target user is monitored by the first device, therefore, the accuracy of discovering a user in a short distance can be improved and, thus, the problem in the prior art that the accuracy of discovering a user in a short distance cannot be guaranteed by using a cell ID is solved.

Figure 2:
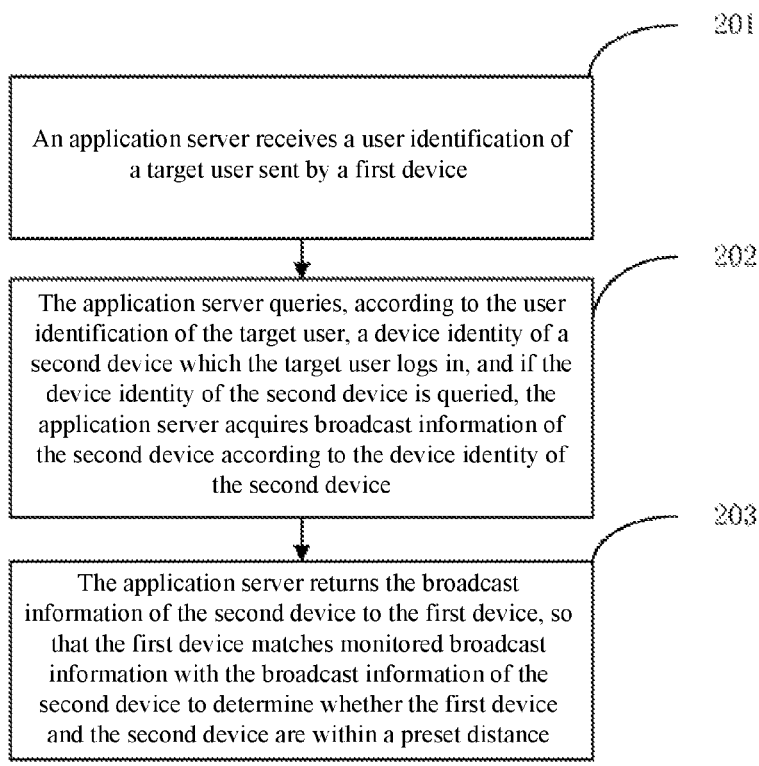
FIG. 2 is a flowchart of a method for device discovery according to an embodiment of the present invention.

Refer to FIG. 2, this embodiment provides a method for device discovery, including:

201, an application server receives a user identification of a target user sent by a first device;

202, the application server queries, according to the user identification of the target user, a device identity of a second device which the target user logs in, and if the device identity of the second device is queried, the application server acquires broadcast information of the second device according to the device identity of the second device;

203, the application server returns the broadcast information of the second device to the first device, so that the first device matches monitored broadcast information with the broadcast information of the second device to determine whether the first device and the second device are within a preset distance.

Beneficial effects of this embodiment include: the application server receives the user identification of the target user sent by the first device, queries, according to the user identification of the target user, the device identity of the second device which the target user logs in, and if the device identity of the second device is queried, the application server acquires the broadcast information of the second device according to the device identity of the second device, and returns the broadcast information of the second device to the first device, so that the first device matches monitored broadcast information with the broadcast information of the second device to determine whether the first device and the second device are within a preset distance. Since the first device is capable of monitoring the broadcast information of other devices within the preset distance, the first device matches the broadcast information of the second device, which is returned by the application server, with monitored broadcast information to determine whether the target user is monitored by the first device, therefore, the accuracy of discovering a user in a short distance can be improved and, thus, the problem in the prior art that the accuracy of discovering a user in a short distance cannot be guaranteed by using a cell ID is solved.

Figure 3:
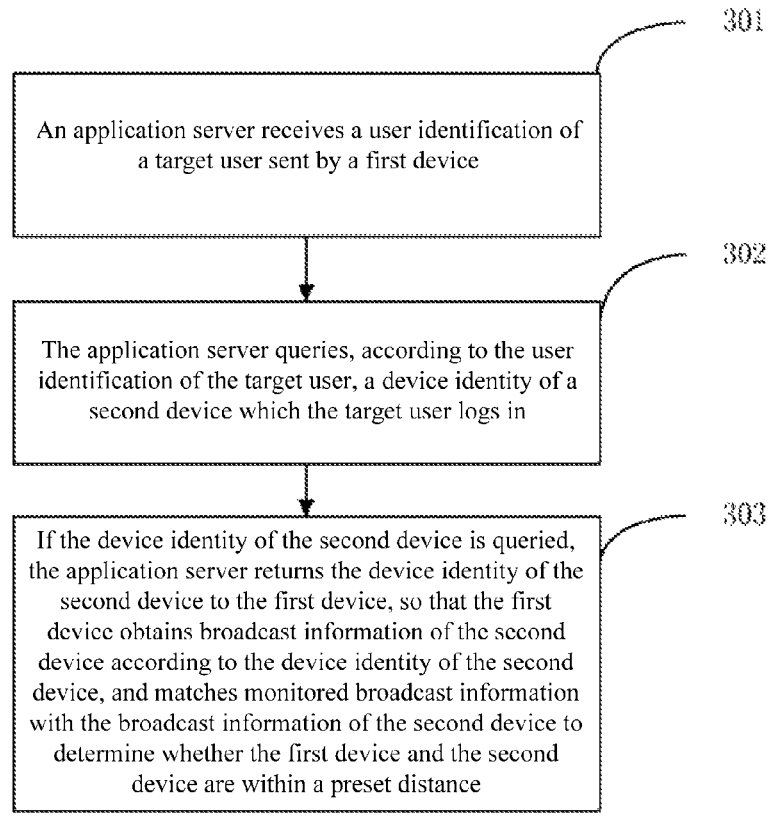
FIG. 3 is a flowchart of a method for device discovery according to an embodiment of the present invention.

Refer to FIG. 3, this embodiment provides a method for device discovery, including:

301, an application server receives a user identification of a target user sent by a first device;

302, the application server queries, according to the user identification of the target user, a device identity of a second device which the target user logs in;

303, if the device identity of the second device is queried, the application server returns the device identity of the second device to the first device, so that the first device obtains broadcast information of the second device according to the device identity of the second device, and matches monitored broadcast information with the broadcast information of the second device to determine whether the first device and the second device are within a preset distance.

Beneficial effects of this embodiment include: the application server receives the user identification of the target user sent by the first device, queries, according to the user identification of the target user, the device identity of the second device which the target user logs in, and returns the device identity of the second device to the first device, so that the first device obtains the broadcast information of the second device according to the device identity of the second device, and matches monitored broadcast information with the broadcast information of the second device to determine whether the first device and the second device are within a preset distance. Since the first device is capable of monitoring the broadcast information of other devices within a preset distance, the application server returns the device identity of the second device to the first device, so that the first device matches the broadcast information of the second device which is acquired according to the device identity of the second device with monitored broadcast information to determine whether the target user is monitored by the first device, therefore, the accuracy of discovering a user in a short distance can be improved and, thus, the problem in the prior art that the accuracy of discovering a user in a short distance cannot be guaranteed by using a cell ID is solved.

Figure 4:
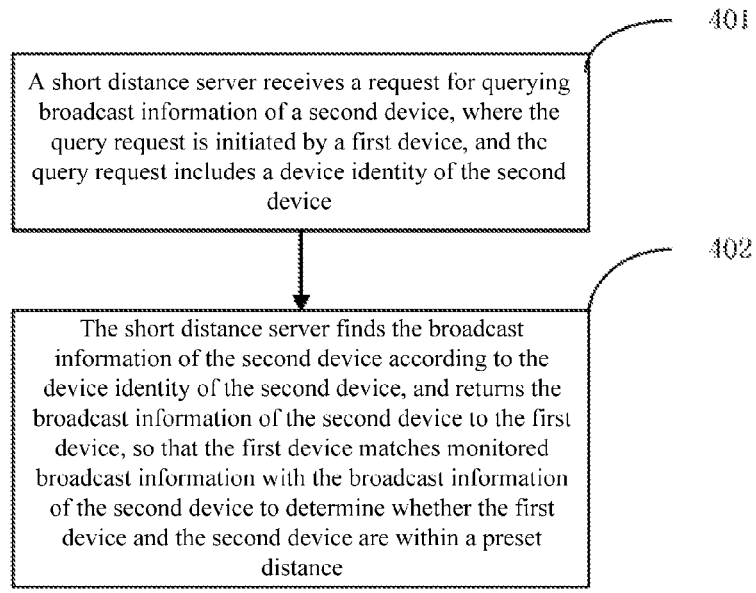
FIG. 4 is a flowchart of a method for device discovery according to an embodiment of the present invention.

Refer to FIG. 4, this embodiment provides a method for device discovery, including:

401, a short distance server receives a request for querying broadcast information of a second device, where the query request is initiated by a first device, and the query request includes a device identity of the second device;

402, the short distance server finds the broadcast information of the second device according to the device identity of the second device, and returns the broadcast information of the second device to the first device, so that the first device matches monitored broadcast information with the broadcast information of the second device to determine whether the first device and the second device are within a preset distance.

Beneficial effects of this embodiment include: the short distance server receives the request for querying broadcast information of the second device, where the query request is initiated by the first device, and the query request includes the device identity of the second device, the short distance server finds the broadcast information of the second device according to the device identity of the second device, and returns the broadcast information of the second device to the first device, so that the first device matches monitored broadcast information with the broadcast information of the second device to determine whether the first device and the second device are within a preset distance. Since the first device is capable of monitoring the broadcast information of other devices within a preset distance, the short distance server returns the broadcast information of the second device to the first device, so that the first device matches the acquired broadcast information of the second device with monitored broadcast information to determine whether the target user is monitored by the first device, therefore, the accuracy of discovering a user in a short distance can be improved and, thus, the problem in the prior art that the accuracy of discovering a user in a short distance cannot be guaranteed by using a cell ID is solved.

Figure 5:
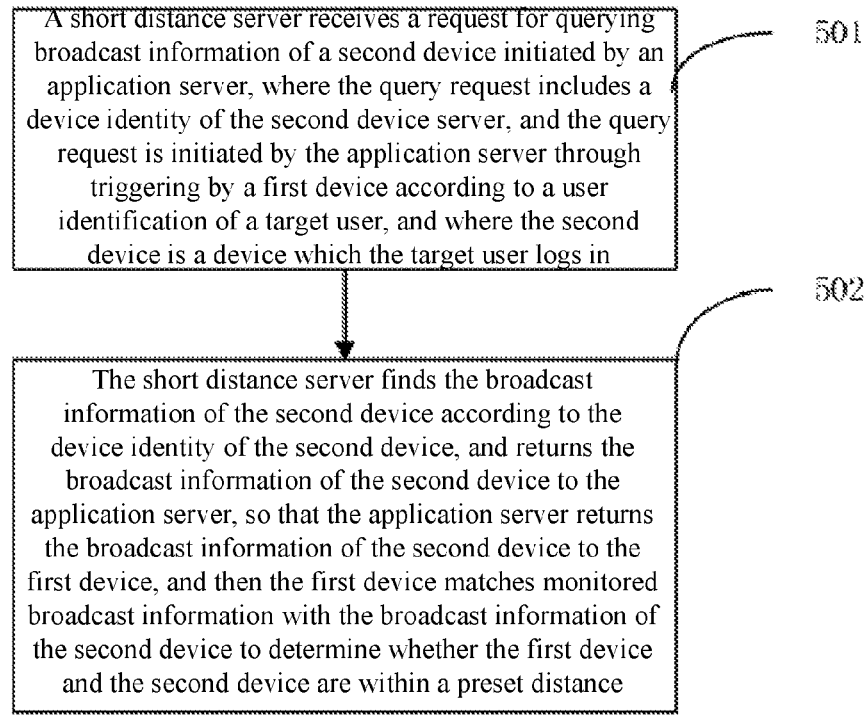
FIG. 5 is a flowchart of a method for device discovery according to an embodiment of the present invention.

Refer to FIG. 5, this embodiment provides a method for device discovery, including:

501, a short distance server receives a request for querying broadcast information of a second device initiated by an application server, where the query request includes a device identity of the second device server, and the query request is initiated by the application server through triggering by a first device according to a user identification of a target user, and where the second device is a device which the target user logs in;

502, the short distance server finds the broadcast information of the second device according to the device identity of the second device, and returns the broadcast information of the second device to the application server, so that the application server returns the broadcast information of the second device to the first device, and then the first device matches monitored broadcast information with the broadcast information of the second device to determine whether the first device and the second device are within a preset distance.

Beneficial effects of this embodiment include: the short distance server receives a request for querying broadcast information of a second device initiated by an application server, where the query request includes a device identity of the second device server, and the query request is initiated by the application server through triggering by a first device according to a user identification of a target user, and where the second device is a device which the target user logs in; the short distance server finds the broadcast information of the second device according to the device identity of the second device, and returns the broadcast information of the second device to the application server, so that the application server returns the broadcast information of the second device to the first device, and then the first device matches monitored broadcast information with the broadcast information of the second device to determine whether the first device and the second device are within a preset distance. Since the first device is capable of monitoring the broadcast information of other devices within a preset distance, the short distance server returns the broadcast information of the second device to the first device, so that the first device matches the acquired broadcast information of the second device with monitored broadcast information to determine whether the target user is monitored by the first device, therefore, the accuracy of discovering a user in a short distance can be improved and, thus, the problem in the prior art that the accuracy of discovering a user in a short distance cannot be guaranteed by using a cell ID is solved.

Figure 6:
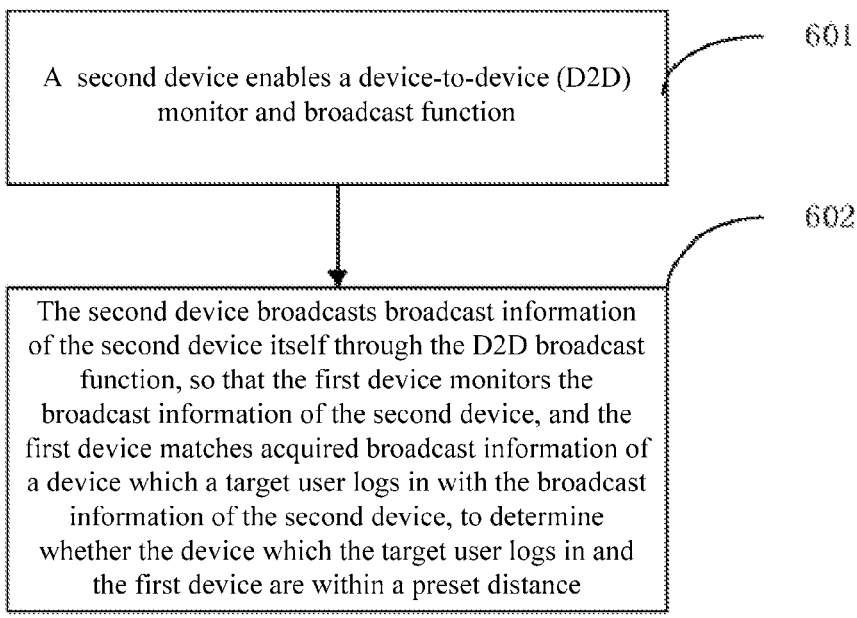
FIG. 6 is a flowchart of a method for device discovery according to an embodiment of the present invention.

Refer to FIG. 6, this embodiment provides a method for device discovery, including:

601, a second device enables a device-to-device (D2D) monitor and broadcast function;

602, the second device broadcasts broadcast information of the second device itself through the D2D broadcast function, so that the first device monitors the broadcast information of the second device, and the first device matches acquired broadcast information of a device which a target user logs in with the broadcast information of the second device, to determine whether the device which the target user logs in and the first device are within a preset distance.

Beneficial effects of this embodiment include: the second device enables the device-to-device (D2D) monitor and broadcast function; the second device broadcasts its own broadcast information through the D2D broadcast function, so that the first device monitors the broadcast information of the second device, and the first device matches the acquired broadcast information of the device which the target user logs in with the broadcast information of the second device, to determine whether the device which the target user logs in and the first device are within a preset distance. Since the first device is capable of monitoring the broadcast information of other devices within a preset distance, the second device enables the D2D function and broadcasts its own broadcast information, so that the first device monitors the broadcast information of the second device, and matches the acquired broadcast information of the second device with the monitored broadcast information after acquiring the broadcast information of the second device, so as to determine whether the target user is monitored by the first device, therefore, the accuracy of discovering a user in a short distance can be improved and, thus, the problem in the prior art that the accuracy of discovering a user in a short distance cannot be guaranteed by using a cell ID is solved.

Figure 7:
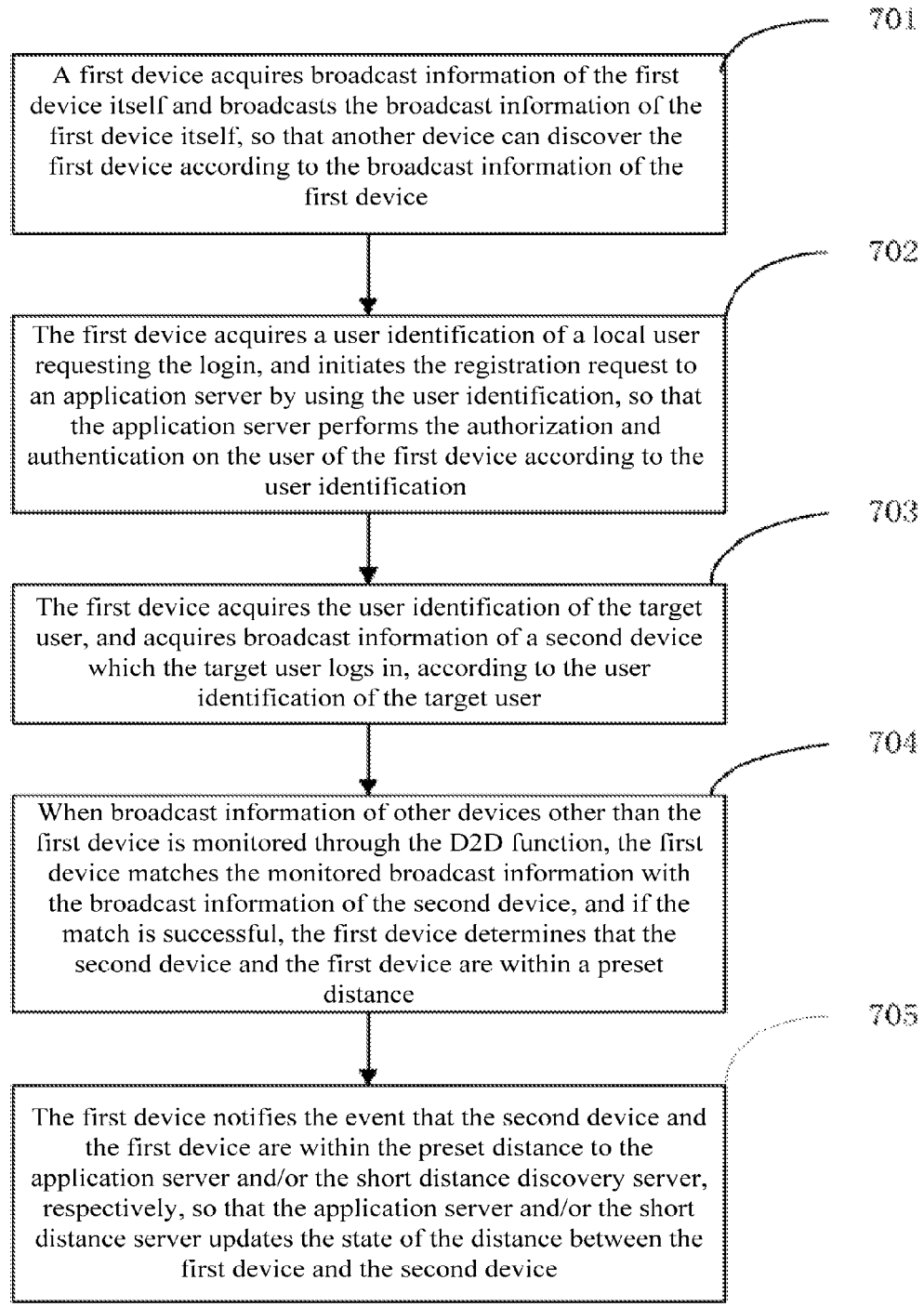
FIG. 7 is a flowchart of a method for device discovery according to an embodiment of the present invention.

Refer to FIG. 7, this embodiment provides a method for device discovery, including:

701, a first device acquires broadcast information of the first device itself and broadcasts the broadcast information of the first device itself, so that another device can discover the first device according to the broadcast information of the first device.

In this step, during the network attachment procedure of the first device, a device discovery service request is initiated to the network side, and the network side assigns broadcast information (Broadcast Code) for the first device after receiving the request of the first device. After enabling the D2D broadcast and monitor function, the first device broadcasts its own broadcast information, so that other devices can discover the first device; meanwhile, the first device also monitors Broadcast Code sent by all the other devices around. Optionally, the first device may broadcast and monitor at preset time intervals, such as every 5 seconds, 8 seconds, 10 seconds or 1 minute, etc., which is not specifically limited in this embodiment. Optionally, the first device may also broadcast and monitor according to the scheduling of a base station, and in which manner the first device performs the D2D broadcast and monitor function is not specifically limited in this embodiment.

Optionally, in this step, the initiating, by the first device, the device discovery service request to the network side to acquire the broadcast information of the first device itself, includes:

1) The first device requests a device discovery service to a MME to which the first device belongs.

In this step, the first device initiates the device discovery service request to the mobility management entity (MME) to which the first device belongs, so as to trigger the MME to acquire the broadcast information of the first device from a short distance server.

2) The MME acquires subscription information of the first device from a HSS, and performs authentication and authorization on whether the first device can perform the discovery service, according to the subscription information of the device in the HSS (Home Subscriber Server, home subscriber server).

In this step, after receiving the discovery service request sent by the first device, the MME to which the first device belongs acquires the subscription information of the first device from the HSS, where the subscription information includes subscription information on whether the first device can perform the device discovery service; if the device is allowed to use the device discovery service, the MME requests the short distance server to assign the Broadcast Code for the device; if the device is not allowed to use the device discovery service, the MME refuses the request of the device and gives the reason for refusal.

3) The MME requests the short distance server to assign the broadcast information for the device.

In this step, the first device is authenticated by the MME, and the MME requests the short distance server to assign the broadcast information for the device. The short distance server is used for assigning the broadcast information for the device, and managing the broadcast information of the device. The short distance server may be an independent network element having an interface with the MME, and some network elements in the existing network may also be expanded to support the function of the short distance server, so that the expanded network element can assign the broadcast information for the device, for example, the short distance server may be achieved by enhancing an MME, a P-CSCF (Proxy-Call Session Control Function) or a HSS, which is not specifically limited in this embodiment.

4) The short distance server assigns the broadcast information for the first device, and returns the broadcast information assigned for the first device to the MME.

In this step, since the MME has authenticated and authorized the device discovery service of the first device, the short distance server does not need to re-perform authentication and authorization for the device, but directly assigns the Broadcast Code for the device and returns the Broadcast Code to the MME.

It should be noted that, after assigning a unique broadcast code for each device, the short distance server may also regularly update the broadcast information assigned for a certain device, which will not be described in detail in this embodiment. If the short distance server regularly assigns different broadcast information for the device, then the short distance server will attach time information of the broadcast information in the broadcast information, where the time information includes assignment time and effective duration, so that when the broadcast information is used in subsequence, whether the broadcast information is a valid broadcast information can be determined according to the assignment time and effective duration of the broadcast information and the current time.

5) The MME sends the broadcast information assigned by the short distance server for the first device to the first device.

It should be noted that, the above method of acquiring the broadcast information of the first device by the first device is operated during the network attachment procedure, however, in the specific device discovery procedure, the device may have already completed the network attachment procedure, and obtained the broadcast information, thus, this step may be not executed in the specific device discovery procedure.

Optionally, in this step, the initiating, by the first device, the device discovery service request to the network side to acquire the broadcast information of the first device itself, includes:

1) The first device initiates a registration request to the short distance server.

In this step, optionally, the first device may acquire its own broadcast information through the MME, and may also directly initiate the registration request to the short distance server, so as to trigger the short distance server to assign the broadcast information for the first device. After receiving the registration request of the device, the short distance server performs the authentication and authorization on the device discovery service of the first device locally; if the device is allowed to use the device discovery service, the short distance server assigns the broadcast information (Broadcast Code) for the device; if the device is not allowed to use the device discovery service, the short distance server refuses the request of the device and gives the reason for refusal.

Optionally, the short distance server may not perform the authentication and authorization on the device discovery service of the first device locally, but queries the subscription information of the device to the HSS, and judges whether the device can use the device discovery service, according to the subscription information of the device.

In specific actual operations, which method is used by the short distance server to perform the authentication and authorization on the device discovery service of the first device is not specifically limited in this embodiment.

2) The short distance server assigns the broadcast information for the first device and sends the broadcast information to the first device.

It should be noted that, in the above method of acquiring the broadcast information of the first device by the first device, the broadcast information of the first device is obtained from the short distance server, however, in the specific device discovery procedure, the device may have already obtained the broadcast information through the short distance server, thus, this step may be not executed in the specific device discovery procedure.

It should be noted that, in specific operations, which method is used by the first device to initiate the device discovery service request to the network side to obtain its own broadcast information is not specifically limited in this embodiment.

This embodiment is described by taking the first device as an example, the procedure of initiating the device discovery service request to the network side by other devices is the same as or similar to that of the first device, which will not be repeated in this embodiment.

702, The first device acquires a user identification of a local user requesting the login, and initiates the registration request to an application server by using the user identification, so that the application server performs the authorization and authentication on the user of the first device according to the user identification.

Optionally, in this embodiment, the user of the first device may log in the application server through a certain application, for example, the user logs in an instant communication application server through a chat tool of the instant communication. There are corresponding user identifications for different applications, when the user logs in the application server by using a certain application on the first device, the corresponding user identification needs to be input; the first device obtains the identification of the local user requesting the login, and initiates the registration request to the application server according to the user identification, where the registration request carries the device identity (Device ID) of the first device; the application server stores the device identity of the first device, and stores the correspondence between the user identification of the user logging in the first device and the device identity of the first device. After receiving the registration request of the first device, the application server performs the authorization and authentication on the user of the first device according to the user identification. In this embodiment, each device corresponds to a unique device identity.

It should be noted that, this step is an operation executed when the device registers to the application server, however, in specific operations, the device may have already completed the registration procedure, so this step may be not executed in the specific device discovery procedure. Or, when the starting the device discovery service by the first device in this embodiment is not because of a certain application, this step may also be not executed, which is not specifically limited in this embodiment.

In this step, all of the devices receiving the user login request will initiate the registration request to the application server; this embodiment is described by taking the first device as an example, and the procedure of initiating the registration to the application server by other devices is the same as or similar to that of the first device, which will not be repeated in this embodiment.

703, The first device acquires the user identification of the target user, and acquires broadcast information of a second device which the target user logs in, according to the user identification of the target user.

Optionally, in this step, after logging in a certain application, the user of the first device requests to perform the discovery service on other users of this application, so as to discover that these target users exist or appear around. Optionally, the user of the first device may perform initial settings in the application to select devices of certain target users as the objects of the device discovery, when the first device requests to register to the application server, meanwhile the application server performs the discovery service of the target users initially set by the user of the first device. Which method described above is used in specific operations will not be repeated in this embodiment.

In this embodiment, the first device may perform the discovery on one or more devices, which is not specifically limited in this embodiment. This step is described by taking executing the operation of discovering the second device by the first device as an example, the procedure of executing the operation of discovering other devices by the first device is the same as or similar to the procedure of executing the operation of discovering the second device by the first device, which will not be repeated in this embodiment.

In this embodiment, when executing the operation of discovering the target user, the first device acquires the user identification of the target user that the user needs to discover, and acquires the broadcast information of the second device which the target user logs in, according to the user identification of the target user. Optionally, in this step, the acquiring, by the first device and according to the user identification of the target user, the broadcast information of the second device which the target user logs in, includes:

1) The first device sends the user identification of the target user to the application server.

In this step, the first device sends the user identification of the target user that needs to be discovered to the application server, so as to trigger the application server to query the device identity of the second device which the target user logs in, and acquires the broadcast information of the second device according to the device identity of the second device.

2) The application server queries the locally stored device identity of the second device which the target user logs in, acquires the broadcast information of the second device according to the device identity of the second device, and returns the broadcast information of the second device to the first device.

After finding the device identity of the second device which the target user logs in, the application server may query whether the broadcast information of the second device corresponding to the device identity of the second device is saved locally, and directly return the broadcast information to the first device if the broadcast information of the second device is found locally. If the broadcast information of the second device carries the time information, whether the broadcast information is valid broadcast information should be judged after the broadcast information of the second device is queried, and if it is, the broadcast information is returned to the first device. If the broadcast information of the second device is not found locally, or the found broadcast information is invalid, the broadcast information or the valid broadcast information of the second device is requested to the short distance server. Optionally, in this step, the application server may not query the broadcast information of the second device locally, but directly query the broadcast information of the second device to the short distance server, which is not specifically limited in this embodiment.

In this step, the short distance server queries the corresponding broadcast information according to the device identity of the second device requested by the application server, and then returns the broadcast information to the application server. If the short distance server does not assign the broadcast information for the device identity (ID) of the second device, then the short distance server returns an unassigned instruction to the application server. In this step, the device discovery cannot be achieved by the first device for the device of which the broadcast information is not assigned.

In this step, optionally, the application server stores the broadcast information corresponding to the device identity of each device for subsequent queries from other applications. Finally, the application server returns a device identity of the target user, of which the registration has been completed and the broadcast information can be obtained, to the first device.

3) The first device receives the broadcast information of the second device returned by the application server.

Optionally, in this step, the acquiring, by the first device and according to the user identification of the target user, the broadcast information of the second device which the target user logs in, includes:

1) The first device sends the user identification of the target user to the application server.

In this step, the first device sends the user identification of the target user that needs to be discovered to the application server, so as to trigger the application server to query the device identity of the second device which the target user logs in.

2) The application server queries the locally stored device identity of the second device which the target user logs in, and returns the device identity of the second device to the first device.

3) The first device receives the device identity of the second device returned by the application server, and queries the broadcast information of the second device to the short distance server according to the device identity of the second device.

In this step, the short distance server queries the corresponding broadcast information according to the request of the first device, and then returns the broadcast information of the second device to the first device. If the short distance server does not assign the broadcast information for the device identity (ID) of the second device, then the short distance server returns an unassigned instruction to the first device. In this step, the device discovery cannot be achieved by the first device for the device of which the broadcast information is not assigned.

4) The first device receives the broadcast information of the second device returned by the short distance server.

It should be noted that, in specific operations, which method described above is used by the first device to obtain the broadcast information of the second device is not specifically limited in this embodiment.

704, When broadcast information of other devices other than the first device is monitored through the D2D function, the first device matches the monitored broadcast information with the broadcast information of the second device, and if the match is successful, the first device determines that the second device and the first device are within a preset distance.

In this step, the first device monitors the broadcast information of the second device after acquiring the broadcast information of the second device. After the first device enables the device discovery service, the first device will monitor the broadcast information of all the other devices, and when a Broadcast Code of another device is monitored at certain time, the first device matches the monitored Broadcast Code with the broadcast information of the second device, if the match is successful, the first device determines that the second device and the first device are within a preset distance, which further represents that the user of the first device has discovered that a user of the second device exists in short distance. Where the preset distance refers to the maximum distance within which the target device can be discovered by the first device.

In this embodiment, after the broadcast information of the second device is monitored, the first device may further calculate the distance between the first device and the second device, so as to accurately determine the distance between the first device and the second device. Optionally, an input interface may be provided on the first device for the user, and the user may set on the interface the distance within which the device needs to be discovered by the first device, for example, the user sets "300 meters" on the input interface provided by the first device, then the first device only needs to find the device within the distance less than 300 meters when performing the device discovery. There can be various methods for calculating the distance between the first device and the second device, such as through a cell ID of the device or GPRS information, etc., or through other methods, which is not specifically limited in this embodiment.

705, The first device notifies the event that the second device and the first device are within the preset distance to the application server and/or the short distance server, respectively, so that the application server and/or the short distance server updates the state of the distance between the first device and the second device.

Optionally, in this embodiment, after determining that the second device and the first device are within the preset distance, the first device may notify this event to the application server and/or the short distance server, so that the application server and/or the short distance server updates the state of the distance between the first device and the second device, and can manage the communication between the first device and the second device after the short distance communication is established between the first device and the second device subsequently.

It should be noted that, this step is optional and may be not executed in specific operations, which is not specifically limited in this embodiment.

Furthermore, it should be noted that, the steps/messages in the above embodiments do not have to be newly defined steps/messages, and may also be transferred by expanding the existing steps/messages between the same two network elements. The principle applies to any interface between the device and any two network elements, such as between the UE and the MME/HSS, and between the UE and the application server, which is not specifically limited in this embodiment.

Beneficial effects of this embodiment include: the first device acquires the user identification of the target user, and acquires, according to the user identification of the target user, the broadcast information of the second device which the target user logs in; when the broadcast information of other device is monitored through the D2D function, the first device matches the monitored broadcast information with the broadcast information of the second device, and if the match is successful, the first device determines that the second device and the first device are within a preset distance. Since the first device is capable of monitoring the broadcast information of other devices within a preset distance, the first device matches the obtained broadcast information of the second device with the monitored broadcast information to determine whether the target user is monitored by the first device, therefore, the accuracy of discovering a user in a short distance can be improved and, thus, the problem in the prior art that the accuracy of discovering a user in a short distance cannot be guaranteed by using a cell ID is solved. In addition, if the second device can be monitored by the first device, then the first device is most likely to establish the short distance communication with the second device, thereby increasing the probability of success of the short distance communication. Besides, the devices obtain their respective broadcast information during the network attachment procedure, or obtain the broadcast information through the short distance server, which is convenient to achieve and easy to operate, and thus will not increase a lot of burden to the existing network. Besides, the user can initiate the device discovery service through a certain application in which friends of the device user are stored, it is more convenient for the user to discover a friend existing in the short distance, thereby improving the user experience when using the device discovery. Besides, the device reports the event to the network side after discovering the device existing in the short distance, thus the network can realize the management and control of the device discovery function.

Figure 8:
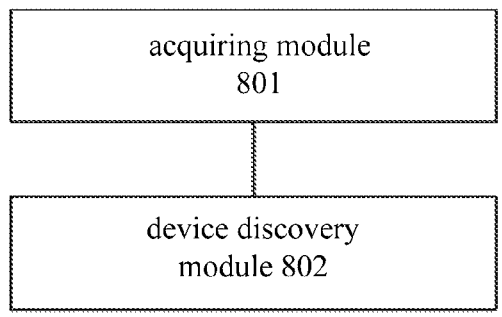
FIG. 8 is a schematic diagram of an apparatus for device discovery according to an embodiment of the present invention.

Refer to FIG. 8, an embodiment provides an apparatus 800 for device discovery, including an acquiring module 801 and a device discovery module 802.

The acquiring module 801 is configured to acquire a user identification of a target user, and acquire, according to the user identification of the target user, broadcast information of a second device which the target user logs in;

the device discovery module 802 is configured to, when broadcast information of another device besides the apparatus itself is monitored through a device-to-device (D2D) function, match the monitored broadcast information with the broadcast information of the second device acquired by the acquiring module 801, and if the match is successful, determine that the second device and the first device are within a preset distance.

Optionally, the acquiring module 801 is further configured to acquire broadcast information of the apparatus itself before acquiring the user identification of the target user.

Figure 9:
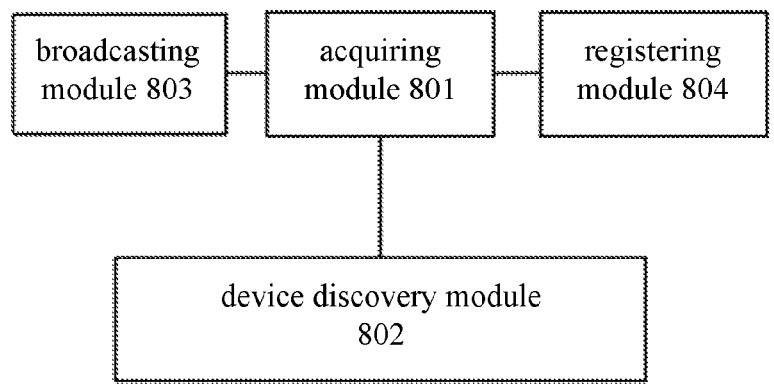
FIG. 9 is a schematic diagram of an apparatus for device discovery according to another embodiment of the present invention.

Refer to FIG. 9, optionally, the apparatus further includes a broadcasting module 803 which is configured to broadcast the broadcast information of the apparatus itself acquired by the acquiring module 801 when the D2D monitor and broadcast function is enabled by the apparatus itself, so that another device besides the apparatus itself is capable of finding the apparatus according to the broadcast information.

Optionally, the acquiring module 801 includes:
a first requesting unit, configured to initiate a device discovery service request to a mobility management entity (MME) to which it belongs, so as to trigger the MME to obtain the broadcast information of the apparatus itself from a short distance server; and
a first receiving unit, configured to receive the broadcast information of the apparatus itself returned by the MME after the first requesting unit initiates the device discovery service request.

Optionally, the acquiring module 801 includes:
a second requesting unit, configured to initiate a registration request to the short distance server, so as to trigger the short distance server to assign broadcast information for it;
a second receiving unit, configured to receive, after receiving the registration request initiated by the second requesting unit, the broadcast information of the apparatus itself returned by the short distance server.

Refer to FIG. 9, optionally, the apparatus further includes:
a registering module 804, configured to acquire a local user identification before the obtaining module 801 obtains the user identification of the target user, and initiate a registration request to the application server according to this user identification, where the registration request includes a device identity, so that the application server stores the device identity and performs authentication and authorization on the user identification.

Optionally, the acquiring module 801 includes:
a first sending unit, configured to send the user identification of the target user, which is acquired by the acquiring module, to the application server, so as to trigger the application server to query a device identity of the second device which the target user logs in and acquire the broadcast information of the second device according to the device identity of the second device;

a third receiving unit, configured to receive the broadcast information of the second device returned by the application server.

Optionally, the acquiring module 801 includes:

a second sending unit, configured to send the user identification of the target user, which is acquired by the acquiring module 801, to the application server, so as to trigger the application server to query a device identity of the second device which the target user logs in;

a fourth receiving unit, configured to receive the device identity of the second device returned by the application server;

a querying unit, configured to query the broadcast information of the second device to the short distance server according to the device identity of the second device;

the fourth receiving unit is further configured to receive the broadcast information of the second device returned by the short distance server.

Optionally, the device discovery module 802 is further configured to notify an event that the second device and the first device are within the preset distance to the application server and/or the short distance server respectively, so that the application server and/or the short distance server updates a state of a distance between the first device and the second device.

In this embodiment, the first device may be any user equipment, which is not specifically limited in this embodiment.

In this embodiment, the module division of the first device described above is only one exemplary manner, in specific executing procedure, the first device may include an application module and a device discovery module. The application module performs the user discovery function, and the device discovery module performs the device discovery function. The application module and the device discovery module are connected via an internal interface, which mainly achieve the following functions: the application module notifies the device discovery module of the device identity or broadcast information of the device which the target user that needs to be discovered locates in and the preset discovery range (distance), to perform the discovery operation; the device discovery module notifies the application module of the identity or the broadcast information of the target device discovered or lost within the preset discovery range. In this embodiment, the application module and the device discovery module specifically performs the operations or relevant operations of the above acquiring module 801 and the device discovery module 802, which will not repeated in this embodiment.

Beneficial effects of this embodiment include: the acquiring module is configured to acquire the user identification of the target user, and acquire, according to the user identification of the target user, the broadcast information of the second device which the target user logs in; the device discovery module is configured to, when the broadcast information of other device besides the apparatus is monitored through the device-to-device (D2D) function, match the monitored broadcast information with the broadcast information of the second device acquired by the acquiring module 801, and if the match is successful, determine that the second device and the apparatus itself are within a preset distance. Since the first device is capable of monitoring the broadcast information of other devices within a preset distance, the first device matches the acquired broadcast information of the apparatus with the monitored broadcast information to determine whether the target user is monitored by the first device, therefore, the accuracy of discovering a user in a short distance can be improved and, thus, the problem in the prior art that the accuracy of discovering a user in a short distance cannot be guaranteed by using a cell ID is solved.

Figure 10:
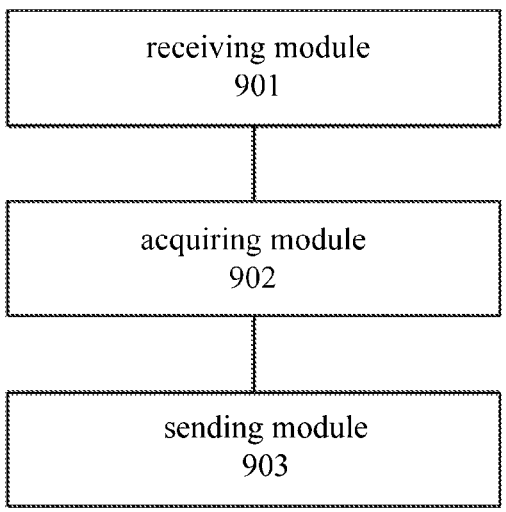
FIG. 10 is a schematic diagram of an application server according to an embodiment of the present invention.

Refer to FIG. 10, an embodiment also provides an application server 900, including a receiving module 901, an acquiring module 902 and a sending module 903.

The receiving module 901 is configured to receive a user identification of a target user sent by a first device;

the acquiring module 902 is configured to query, according to the user identification of the target user received by the receiving module 901, a device identity of a second device which the target user logs in, and if the device identity of the second device is queried, acquire broadcast information of the second device according to the device identity of the second device;

the sending module 903 is configured to return the broadcast information of the second device, which is acquired by the acquiring module, to the first device, so that the first device matches monitored broadcast information with the broadcast information of the second device to determine whether the first device and the second device are within a preset distance.

Optionally, the acquiring module 902 is specifically configured to:

query the broadcast information corresponding to the device identity of the second device in the server itself, and acquire the broadcast information of the second device; or request the broadcast information of the second device to a short distance server according to the device identity of the second device, receive and store the broadcast information of the second device returned by the short distance server.

Figure 11:
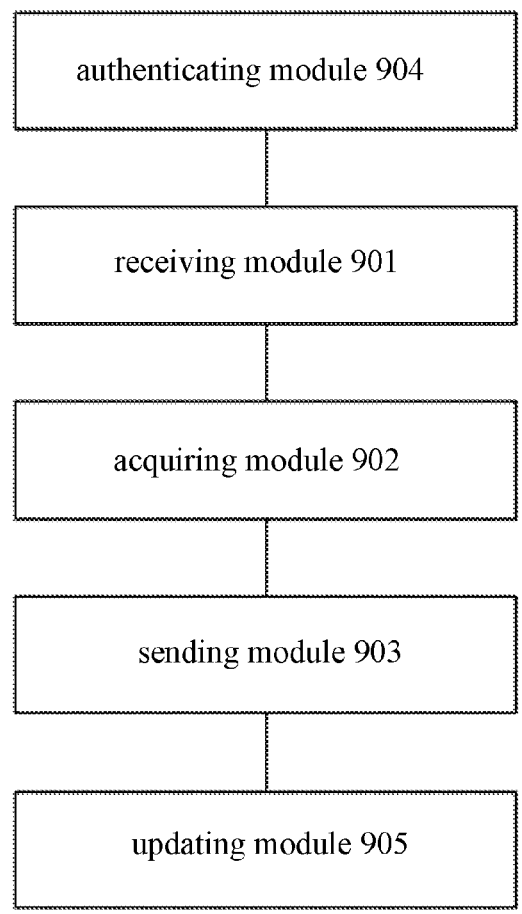
FIG. 11 is a schematic diagram of an application server according to another embodiment of the present invention.

Optionally, refer to FIG. 11, the server further includes:

an authenticating module 904, configured to receive a registration request sent by the first device before the receiving module 901 receives the user identification of the target user sent by the first device, where the registration request includes a device identity of the first device and a user identification of a user who logs in the first device; store the device identity of the first device and perform authentication and authorization on the user identification.

Refer to FIG. 11, optionally, the server further includes:

an updating module 905, configured to receive, after the sending module 903 returns the broadcast information of the second device to the first device, an event that the second device and the first device are within the preset distance, where the event is sent by the first device, and update a state of a distance between the first device and the second device.

Beneficial effects of this embodiment include: the application server receives the user identification of the target user sent by the first device, queries, according to the user identification of the target user, the device identity of the second device which the target user logs in, and if the device identity of the second device is queried, the application server acquires the broadcast information of the second device according to the device identity of the second device, and returns the broadcast information of the second device to the first device, so that the first device matches monitored broadcast information with the broadcast information of the second device to determine whether the first device and the second device are within a preset distance. Since the first device is capable of monitoring the broadcast information of other devices within the preset distance, the first device matches the broadcast information of the second device, which is returned by the application server, with monitored broadcast information to determine whether the target user is monitored by the first device, therefore, the accuracy of discovering a user in a short distance can be improved and, thus, the problem in the prior art that the accuracy of discovering a user in a short distance cannot be guaranteed by using a cell ID is solved.

Figure 12:
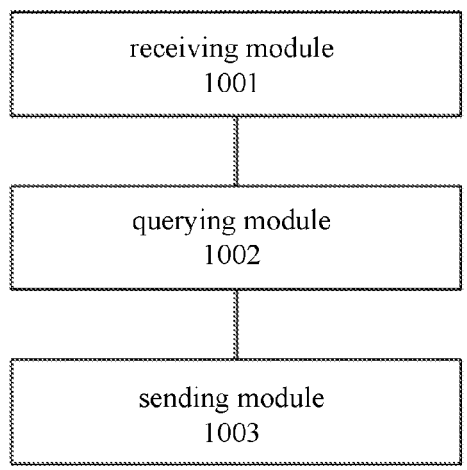
FIG. 12 is a schematic diagram of an application server according to another embodiment of the present invention.

Refer to FIG. 12, another embodiment provides an application server 1000, including a receiving module 1001, a querying module 1002 and a sending module 1003.

The receiving module 1001 is configured to receive a user identification of a target user sent by a first device;

the querying module 1002 is configured to query, according to the user identification of the target user received by the receiving module 1001, a device identity of a second device which the target user logs in;

the sending module 1003 is configured to, if the device identity of the second device is queried by the querying module 1002, return the device identity of the second device to the first device, so that the first device obtains broadcast information of the second device according to the device identity of the second device, and matches monitored broadcast information with the broadcast information of the second device to determine whether the first device and the second device are within a preset distance.

Figure 13:
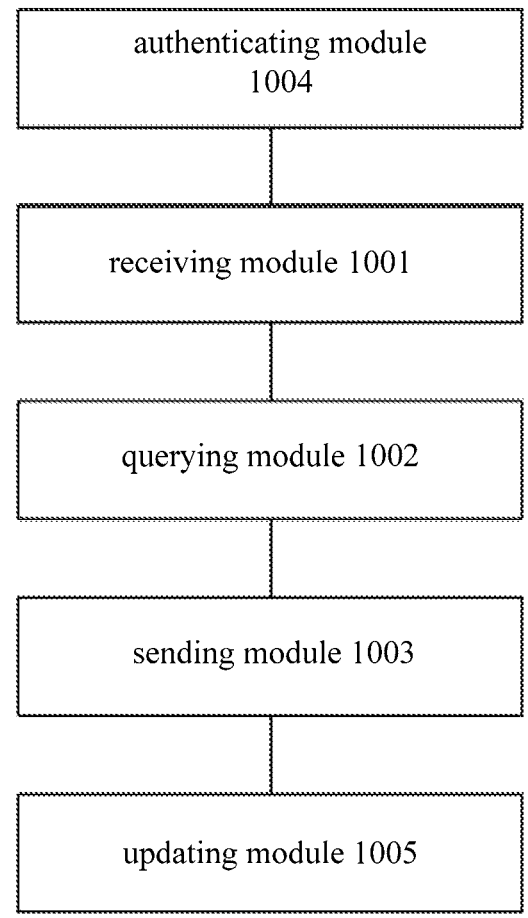
FIG. 13 is a schematic diagram of an application server according to another embodiment of the present invention.

Refer to FIG. 13, optionally, the server further includes:

an authenticating module 1004, configured to receive a registration request sent by the first device before the receiving module 1001 receives the user identification of the target user sent by the first device, where the registration request includes a device identity of the first device and a user identification of a user who logs in the first device, store the device identity of the first device and perform authentication and authorization on the user identification.

Optionally, refer to FIG. 13, the server further includes:

an updating module 1005, configured to receive, after the sending module 1003 returns the device identity of the second device to the first device, an event that the second device and the first device are within a preset distance, where the event is sent by the first device, and update a state of a distance between the first device and the second device.

Beneficial effects of this embodiment include: the application server receives the user identification of the target user sent by the first device, queries, according to the user identification of the target user, the device identity of the second device which the target user logs in, and returns the device identity of the second device to the first device, so that the first device obtains the broadcast information of the second device according to the device identity of the second device, and matches monitored broadcast information with the broadcast information of the second device to determine whether the first device and the second device are within a preset distance. Since the first device is capable of monitoring the broadcast information of other devices within a preset distance, the application server returns the device identity of the second device to the first device, so that the first device matches the broadcast information of the second device which is acquired according to the device identity of the second device with monitored broadcast information to determine whether the target user is monitored by the first device, therefore, the accuracy of discovering a user in a short distance can be improved and, thus, the problem in the prior art that the accuracy of discovering a user in a short distance cannot be guaranteed by using a cell ID is solved.

Figure 14:
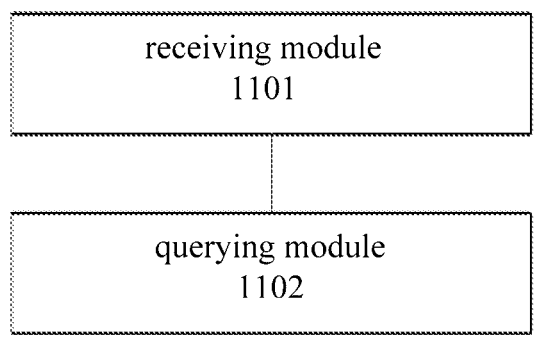
FIG. 14 is a schematic diagram of a short distance server according to an embodiment of the present invention.

Refer to FIG. 14, an embodiment also provides a short distance server 1100, the server includes a receiving module 1101 and a querying module 1102.

The receiving module 1101 is configured to receive a request for querying broadcast information of a second device, where the query request is initiated by a first device and the query request includes a device identity of the second device;

the querying module 1102 is configured to find the broadcast information of the second device according to the device identity of the second device received by the receiving module 1101, and return the broadcast information of the second device to the first device, so that the first device matches monitored broadcast information with the broadcast information of the second device to determine whether the first device and the second device are within a preset distance.

Optionally, the receiving module 1101 is further configured to for acquiring broadcast information of the first device before receiving the request for querying the broadcast information of the second device initiated by the first device, where the request for acquiring the broadcast information of the first device is initiated by a mobility management entity (MME) to which the first device belongs.

Figure 15:
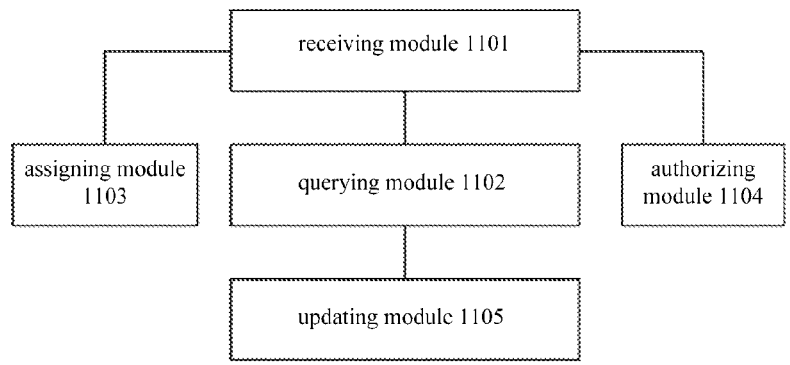
FIG. 15 is a schematic diagram of a short distance server according to another embodiment of the present invention.

Refer to FIG. 15, optionally, the server further includes an assigning module 1103 which is configured to assign the broadcast information for the first device according to the request initiated by the MME, and return the broadcast information to the first device through the MME.

Optionally, the receiving module 1101 is further configured to receive a registration request initiated by the first device before receiving the request for querying the broadcast information of the second device initiated by the first device.

Refer to FIG. 15, optionally, the server further includes an authorizing module 1104 which is configured to perform authorization on the first device according to the request initiated by the first device, and assign the broadcast information for the first device after the authorization is passed.

Optionally, the authorizing module 1104 is specifically configured to:

perform authorization on the first device locally according to the request initiated by the first device; or query, according to the request initiated by the first device, subscription information of the first device to a home subscriber server (HSS) to which the first device belongs, and perform authorization on the first device according to the subscription information of the first device returned by the HSS.

Refer to FIG. 15, optionally, the server further includes:

an updating module 1105, configured to receive, after the querying module 1102 returns the broadcast information of the second device to the first device, an event that the second device and the first device are within the preset distance, where the event is sent by the first device, and update a state of a distance between the first device and the second device.

Beneficial effects of this embodiment include: the short distance server receives the request for querying broadcast information of the second device, where the query request is initiated by the first device, and the query request includes the device identity of the second device, the short distance server finds the broadcast information of the second device according to the device identity of the second device, and returns the broadcast information of the second device to the first device, so that the first device matches monitored broadcast information with the broadcast information of the second device to determine whether the first device and the second device are within a preset distance. Since the first device is capable of monitoring the broadcast information of other devices within a preset distance, the short distance server returns the broadcast information of the second device to the first device, so that the first device matches the acquired broadcast information of the second device with monitored broadcast information to determine whether the target user is monitored by the first device, therefore, the accuracy of discovering a user in a short distance can be improved and, thus, the problem in the prior art that the accuracy of discovering a user in a short distance cannot be guaranteed by using a cell ID is solved.

Figure 16:
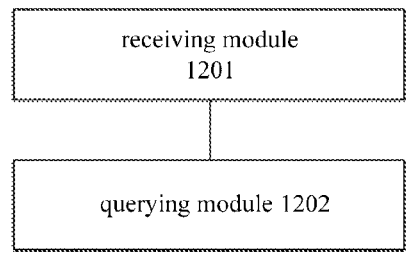
FIG. 16 is a schematic diagram of a short distance server according to an embodiment of the present invention.

Refer to FIG. 16, another embodiment also provides a short distance server 1200, the server includes a receiving module 1201 and a querying module 1202.

The receiving module 1202 is configured to receive a request for querying broadcast information of a second device initiated by an application server, where the query request includes a device identity of the second device server, and the query request is initiated by the application server through triggering by a first device according to a user identification of a target user, and the second device is a device which the target user logs in;

the querying module 1202 is configured to find the broadcast information of the second device according to the device identity of the second device received by the receiving module 1202, and return the broadcast information of the second device to the application server, so that the application server returns the broadcast information of the second device to the first device, and then the first device matches monitored broadcast information with the broadcast information of the second device to determine whether the first device and the second device are within a preset distance.

Optionally, the receiving module 1201 is further configured to receive a request for acquiring broadcast information of the first device before receiving the request for querying the broadcast information of the second device initiated by the application server, where the request for acquiring the broadcast information of the first device is initiated by a mobility management entity (MME) to which the first device belongs.

Figure 17:
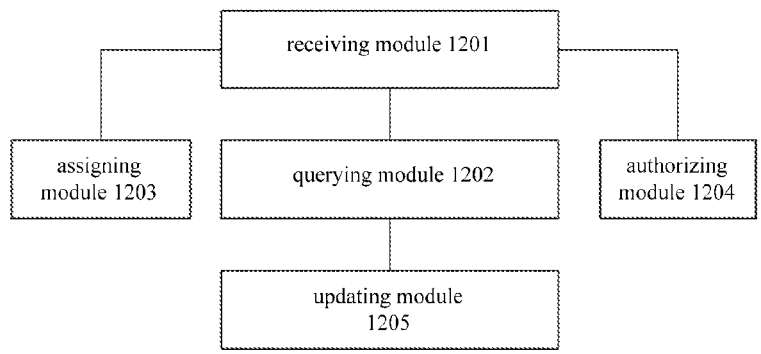
FIG. 17 is a schematic diagram of a short distance server according to another embodiment of the present invention.

Refer to FIG. 17, optionally, the server further includes an assigning module 1203 which is configured to assign the broadcast information for the first device according to the request initiated by the MME, and return the broadcast information to the first device through the MME.

Optionally, the receiving module is further configured to receive a registration request initiated by the first device before receiving the request for querying the broadcast information of the second device initiated by the application server.

Refer to FIG. 17, optionally, the server further includes an authorizing module 1204 which is configured to perform authorization on the first device according to the request initiated by the first device, and assign the broadcast information for the first device after the authorization is passed.

Where, the authorizing module 1204 is specifically configured to:

perform authorization on the first device locally according to the request initiated by the first device; or query, according to the request initiated by the first device, subscription information of the first device to a home subscriber server (HSS) to which the first device belongs, and perform authorization on the first device according to the subscription information of the first device returned by the HSS.

Refer to FIG. 17, optionally, the server further includes:

an updating module 1205, configured to receive, after the querying module 1202 returns the broadcast information of the second device to the first device, an event that the second device and the first device are within the preset distance, where the event is sent by the first device, and update a state of a distance between the first device and the second device.

Beneficial effects of this embodiment include: the short distance server receives a request for querying broadcast information of a second device initiated by an application server, where the query request includes a device identity of the second device server, and the query request is initiated by the application server through triggering by a first device according to a user identification of a target user, and where the second device is a device which the target user logs in; the short distance server finds the broadcast information of the second device according to the device identity of the second device, and returns the broadcast information of the second device to the application server, so that the application server returns the broadcast information of the second device to the first device, and then the first device matches monitored broadcast information with the broadcast information of the second device to determine whether the first device and the second device are within a preset distance. Since the first device is capable of monitoring the broadcast information of other devices within a preset distance, the short distance server returns the broadcast information of the second device to the first device, so that the first device matches the acquired broadcast information of the second device with monitored broadcast information to determine whether the target user is monitored by the first device, therefore, the accuracy of discovering a user in a short distance can be improved and, thus, the problem in the prior art that the accuracy of discovering a user in a short distance cannot be guaranteed by using a cell ID is solved.

Figure 18:
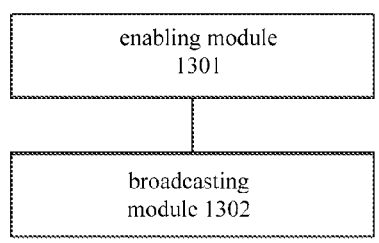
FIG. 18 is a schematic diagram of an apparatus for device discovery according to an embodiment of the present invention.

Refer to FIG. 18, an embodiment further provides an apparatus 1300 for device discovery, including an enabling module 1301 and a broadcasting module 1302.

The enabling module 1301 is configured to enable a device-to-device (D2D) monitor and broadcast function of the apparatus;

the broadcasting module 1302 is configured to broadcast broadcast information of the apparatus after the enabling module enables the monitor and broadcast function, so that a first device is capable of monitoring the broadcast information of a second device, and the first device matches acquired broadcast information of a device which a target user logs in with the broadcast information of the second device, to determine whether the device which the target user logs in and the first device are within a preset distance.

Figure 19:
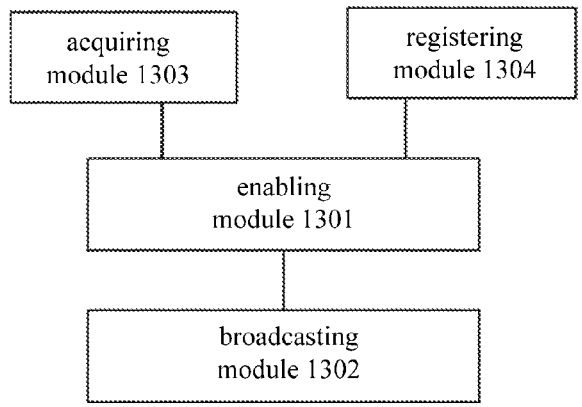
FIG. 19 is a schematic diagram of an apparatus for device discovery according to another embodiment of the present invention.

Refer to FIG. 19, the apparatus for device discovery further includes:

an acquiring module 1303, configured to acquire the broadcast information of the apparatus before the enabling module 1301 enables the D2D monitor and broadcast function, so that another device besides the apparatus is capable of discovering the apparatus according to the broadcast information.

Optionally, the acquiring module 1303 includes:

a first requesting unit, configured to initiate a device discovery service request to a mobility management entity (MME) to which it belongs, so as to trigger the MME to acquire the broadcast information of the apparatus from a short distance server;

a first receiving unit, configured to receive the broadcast information of the second device returned by the MME after the first requesting unit initiates the device discovery service request.

Optionally, the obtaining module 1303 includes:

a second requesting unit, configured to initiate a registration request to a short distance server, so as to trigger the short distance server to assign the broadcast information for the second device;

a second receiving unit, configured to receive the broadcast information of the second device returned by the short distance server after the second requesting unit initiates the registration request.

Refer to FIG. 19, optionally, the apparatus for device discovery further includes:

a registering module 1304, configured to acquire a local user identification before the enabling module 1301 enables the D2D monitor and broadcast function, and initiate a registration request to the application server according to the user identification, where the registration request includes a device identity of the second device, so that the application server stores the device identity of the second device and performs authentication and authorization on the user identification.

Beneficial effects of this embodiment include: the enabling module is configured to enable the device-to-device (D2D) monitor and broadcast function of the apparatus itself; the broadcasting module is configured to broadcast the broadcast information of the apparatus itself after the enabling module enables the monitor and broadcast function, so that the first device is capable of monitoring the broadcast information of the second device, and the first device matches the acquired broadcast information of the device which the target user logs in with the broadcast information of the second device, to determine whether the device which the target user logs in and the first device are within a preset distance. Since the first device is capable of monitoring the broadcast information of other devices within a preset distance, the apparatus enables the D2D function and broadcasts its own broadcast information, so that the first device can monitor the broadcast information of the apparatus, and after the first device acquires the broadcast information of the apparatus, the first device matches the acquired broadcast information with the monitored broadcast information, to determine whether the target user is monitored by the first device, therefore, the accuracy of discovering a user in a short distance can be improved and, thus, the problem in the prior art that the accuracy of discovering a user in a short distance cannot be guaranteed by using a cell ID is solved.

Figure 20:
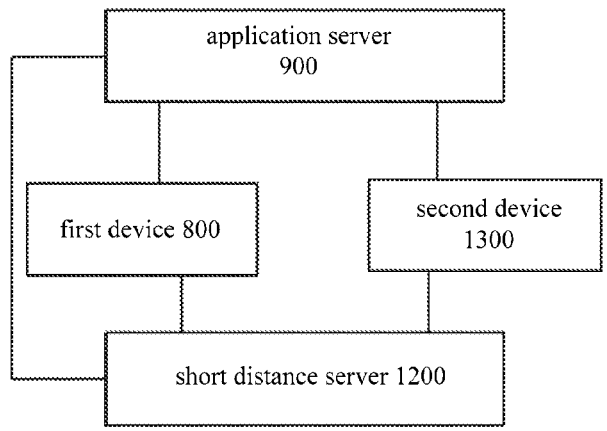
FIG. 20 is a schematic diagram of a system for device discovery according to an embodiment of the present invention.

Refer to FIG. 20, this embodiment also provides a system for device discovery, the system includes: the first device 800 as described above, the application server 900 as described above, the short distance server 1200 as described above and the second device 1300 as described above.

Beneficial effects of this embodiment include: the application server receives the user identification of the target user sent by the first device, queries, according to the user identification of the target user, the device identity of the second device which the target user logs in, and if the device identity of the second device is queried, the application server acquires the broadcast information of the second device according to the device identity of the second device, and returns the broadcast information of the second device to the first device, so that the first device matches monitored broadcast information with the broadcast information of the second device to determine whether the first device and the second device are within a preset distance. Since the first device is capable of monitoring the broadcast information of other devices within the preset distance, the first device matches the broadcast information of the second device, which is returned by the application server, with monitored broadcast information to determine whether the target user is monitored by the first device, therefore, the accuracy of discovering a user in a short distance can be improved and, thus, the problem in the prior art that the accuracy of discovering a user in a short distance cannot be guaranteed by using a cell ID is solved.

Figure 21:
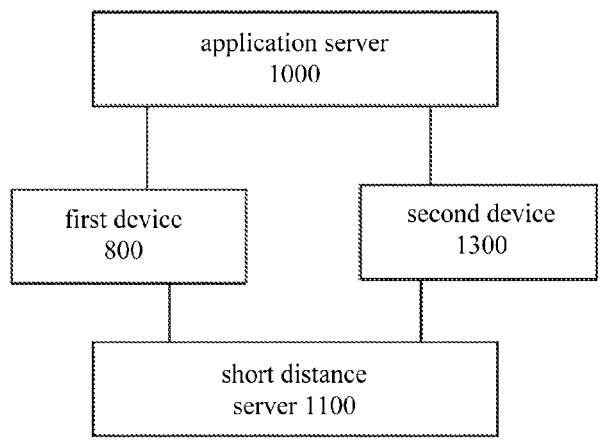
FIG. 21 is a schematic diagram of a system for device discovery according to another embodiment of the present invention.

Refer to FIG. 21, this embodiment also provides a system for device discovery, the system includes: the first device 800 as described above, the application server 1000 as described above, the short distance server 1100 as described above and the second device 1300 as described above.

Beneficial effects of this embodiment include: the application server receives the user identification of the target user sent by the first device, queries, according to the user identification of the target user, the device identity of the second device which the target user logs in, and returns the device identity of the second device to the first device, so that the first device obtains the broadcast information of the second device according to the device identity of the second device, and matches monitored broadcast information with the broadcast information of the second device to determine whether the first device and the second device are within a preset distance. Since the first device is capable of monitoring the broadcast information of other devices within a preset distance, the application server returns the device identity of the second device to the first device, so that the first device matches the broadcast information of the second device which is acquired according to the device identity of the second device with monitored broadcast information to determine whether the target user is monitored by the first device, therefore, the accuracy of discovering a user in a short distance can be improved and, thus, the problem in the prior art that the accuracy of discovering a user in a short distance cannot be guaranteed by using a cell ID is solved.

Specifically, the first device, application server, short distance server, second device and system provided by these embodiments may belong to the same concept with the method embodiments, and their specific implementations can be found in the method embodiments, which will not be repeated here.

It should be noted that, in the above embodiments of the first device, second device, application server and short distance server, each module included therein is divided upon logic functions, however, the invention is not limited to this kind of division, as long as corresponding functions can be achieved; in addition, specific names of the functional modules are only for being distinguished from each other, but not intended to limit the protection scope of the present invention.

Furthermore, person skilled in this art can understand that: the implementation of all or part of the steps in the above embodiments can be completed by hardware, or by hardware related to program instructions. The program may be stored in a computer readable storage medium, and the storage medium may be read only memory, diskette or compact disc, etc.

The foregoing embodiments are only preferred embodiments of the present invention other than limiting the present invention. Any modification, substitution, improvement and the like made without departing from the essence and principle of the present invention should all be covered in the protection scope of the present invention.

What is claimed is:

1. A method for device discovery, comprising:
acquiring, by a first device, a user identification of a target user, and acquiring, according to the user identification of the target user, broadcast information of a second device to which the target user logs in; and when broadcast information of another device except the first device is monitored through a device-to-device (D2D) function, matching, by the first device, the monitored broadcast information of another device with the broadcast information of the second device, and when the matching is successful, determining, by the first device, that the second device and the first device are within a preset distance;

wherein the acquiring, according to the user identification of the target user, the broadcast information of the second device to which the target user logs in, comprises:

sending, by the first device, the user identification of the target user to an application server, so as to trigger the application server to query a device identity of the second device to which the target user logs in and acquire the broadcast information of the second device according to the device identity of the second device; and receiving, by the first device, the broadcast information of the second device returned by the application server.

2. The method according to claim 1, wherein before the acquiring, by the first device, the user identification of the target user, the method further comprises:

acquiring, by the first device, broadcast information of the first device itself; and broadcasting, by the first device, the broadcast information of the first device itself after enabling the D2D monitor and broadcast function, so that the another device except the first device is capable of discovering the first device according to the broadcast information of the first device.

3. The method according to claim 1, wherein before the acquiring, by the first device, the user identification of the target user, the method further comprises:

acquiring, by the first device, a local user identification, and initiating a registration request to an application server according to the user identification, wherein the registration request comprises a device identity of the first device, so that the application server stores the device identity of the first device and perform authentication and authorization on the user identification.

4. An apparatus for device discovery, comprising:
a processor; and
a memory coupled to a processor, wherein the memory stores processor-executable instructions which when executed causes the processor to implement operations including:

acquiring a user identification of a target user, and acquiring, according to the user identification of the target user, broadcast information of a second device to which the target user logs in; and when broadcast information of another device except the apparatus itself is monitored through a device-to-device (D2D) function, matching the monitored broadcast information of the another device with the broadcast information of the second device, and when the matching is successful, determining that the second device and the first device are within a preset distance.

5. The apparatus according to claim 4, wherein the operations further include:

acquiring broadcast information of the apparatus itself before acquiring the user identification of the target user;

broadcasting the broadcast information of the apparatus itself when the D2D monitor and broadcast function is enabled by the apparatus itself, so that the another device except the apparatus itself is capable of finding the apparatus according to the broadcast information.

6. The apparatus according to claim 5, wherein the operations further include:

initiating a registration request to a short distance server, so as to trigger the short distance server to assign broadcast information for it; and receiving, after receiving the registration request initiated by the second requesting unit, the broadcast information of the apparatus itself returned by the short distance server.

7. The apparatus according to claim 4, wherein the operations further include:

acquiring a local user identification before obtaining the user identification of the target user, and initiating a registration request to the application server according to the user identification, wherein the registration request comprises a device identity, so that the application server stores the device identity and performs authentication and authorization on the user identification.

8. A short distance server, comprising:
a processor; and
a memory coupled to a processor, wherein the memory stores processor-executable instructions which when executed causes the processor to implement operations including;

receiving a request for querying broadcast information of a second device, wherein the query request is initiated by a first device and the query request comprises a device identity of the second device; and searching for the broadcast information of the second device according to the device identity of the second device, and returning the broadcast information of the second device to the first device, so that the first device matches monitored broadcast information of another device except the first device with the broadcast information of the second device to determine whether the first device and the second device are within a preset distance.

9. The server according to claim 8, wherein the operations further include:

receiving a registration request initiated by the first device before receiving the request for querying the broadcast information of the second device initiated by the first device;

performing authorization on the first device according to the registration request which is initiated by the first device, and assigning the broadcast information for the first device after the authorization is passed.

10. The server according to claim 9, wherein the operations further include:

performing authorization on the first device locally according to the registration request initiated by the first device.

11. The method according to claim 1, where the acquiring, according to the user identification of the target user, the broadcast information of the second device to which the target user logs in, comprises:

sending, by the first device, the user identification of the target user to an application server, so as to trigger the application server to query a device identity of the second device to which the target user logs in;

receiving, by the first device, the device identity of the second device returned by the application server;

querying, by the first device, the broadcast information of the second device to a short distance server according to the device identity of the second device; and receiving, by the first device, the broadcast information of the second device returned by the short distance server.

12. The server according to claim 9, wherein the operations further include:

querying, according to the registration request initiated by the first device, subscription information of the first device to a home subscriber server (HSS) to which the first device belongs, and performing authorization on the first device according to the subscription information of the first device returned by the HSS.

* * * * *